(12) United States Patent
Nilsson et al.

(10) Patent No.: US 12,386,988 B2
(45) Date of Patent: Aug. 12, 2025

(54) SECURE CONTENT AUGMENTATION SYSTEMS AND METHODS

(71) Applicant: Intertrust Technologies Corporation, Berkeley, CA (US)

(72) Inventors: Jarl Nilsson, Mountain View, CA (US); Vivek Palan, San Francisco, CA (US); Michael Manente, Sudbury, MA (US)

(73) Assignee: Intertrust Technologies Corporation, Berkeley, CA (US)

( * ) Notice: Subject to any disclaimer, the term of this patent is extended or adjusted under 35 U.S.C. 154(b) by 0 days.

(21) Appl. No.: 18/666,716

(22) Filed: May 16, 2024

(65) Prior Publication Data

US 2024/0303353 A1  Sep. 12, 2024

Related U.S. Application Data

(63) Continuation of application No. 18/112,444, filed on Feb. 21, 2023, now Pat. No. 12,019,770, which is a
(Continued)

(51) Int. Cl.
*H04L 29/06* (2006.01)
*G06F 21/62* (2013.01)
(Continued)

(52) U.S. Cl.
CPC ............ *G06F 21/62* (2013.01); *H04L 9/0819* (2013.01); *H04N 1/32325* (2013.01); *G06F 2221/2141* (2013.01); *H04L 2209/80* (2013.01)

(58) Field of Classification Search
CPC .. G06F 21/62; G06F 2221/2141; G06F 21/16; H04L 9/0819; H04L 2209/80; H04L 2209/608; H04L 9/0643; H04N 1/32325
See application file for complete search history.

(56) References Cited

U.S. PATENT DOCUMENTS

| | | |
|---|---|---|
| 8,451,266 B2 | 5/2013 | Hertenstein |
| 9,600,938 B1 | 3/2017 | Kjallstrom et al. |
| | (Continued) | |

FOREIGN PATENT DOCUMENTS

| | | |
|---|---|---|
| CN | 1287357 | 3/2001 |
| CN | 110264390 | 9/2019 |
| | (Continued) | |

OTHER PUBLICATIONS

Zhao et al. (Zhao B, Fang L, Zhang H, Ge C, Meng W, Liu L, Su C. Y-DWMS: A Digital Watermark Management System Based on Smart Contracts. Sensors. 2019; 19(14):3091. https://doi.org/10.3390/s19143091) (Year: 2019).*

(Continued)

*Primary Examiner* — Shawnchoy Rahman
(74) *Attorney, Agent, or Firm* — Thayne and Davis LLC; John P. Davis

(57) ABSTRACT

The disclosure relates to, among other things, systems and methods for augmenting and/or otherwise supplementing content using watermarks. Consistent with embodiments disclosed herein, a user device such as a smartphone may be used to retrieve watermark information encoded in a watermark. The watermark information may comprise content that supplements an associated content item, link and/or location information that may be used to retrieve supplemental content, and/or the like. In some embodiments, the watermark information may comprise cryptographic and/or other access token information used to decrypt and/or otherwise access supplemental content.

18 Claims, 8 Drawing Sheets

Related U.S. Application Data continuation of application No. 17/233,043, filed on Apr. 16, 2021, now Pat. No. 11,610,013.

(60) Provisional application No. 63/011,590, filed on Apr. 17, 2020.

(51) Int. Cl.
  *H04L 9/08* (2006.01)
  *H04N 1/32* (2006.01)

(56) References Cited

U.S. PATENT DOCUMENTS

| | | |
|---|---|---|
| 10,198,871 B1 | 2/2019 | Hariton |
| 10,318,725 B2 | 6/2019 | Venkataramani |
| 10,740,613 B1 | 8/2020 | Sinclair |
| 10,755,252 B1* | 8/2020 | Li .................. G06Q 20/1235 |
| 2002/0015494 A1 | 2/2002 | Nagai et al. |
| 2002/0106192 A1 | 8/2002 | Sako |
| 2003/0032033 A1 | 2/2003 | Anglin et al. |
| 2003/0187798 A1 | 10/2003 | McKinley et al. |
| 2003/0202679 A1 | 10/2003 | Rodriguez |
| 2005/0091338 A1 | 4/2005 | de la Huerga |
| 2009/0158318 A1 | 6/2009 | Levy |
| 2014/0289759 A1 | 9/2014 | Nakano et al. |
| 2014/0340423 A1 | 11/2014 | Taylor et al. |
| 2015/0123966 A1 | 5/2015 | Newman |
| 2017/0048700 A1 | 2/2017 | Huang et al. |
| 2018/0004934 A1 | 1/2018 | Venkataramani |
| 2018/0182169 A1 | 6/2018 | Petro et al. |
| 2020/0226233 A1* | 7/2020 | Penugonda ........... H04L 9/3239 |
| 2020/0357188 A1 | 11/2020 | Kurabayashi |

FOREIGN PATENT DOCUMENTS

| | | |
|---|---|---|
| CN | 114254343 | 3/2022 |
| WO | 9941900 | 8/1999 |
| WO | 9953428 | 10/1999 |
| WO | 2004081649 | 9/2004 |
| WO | 2014006886 | 1/2014 |
| WO | 2014114118 | 7/2014 |

OTHER PUBLICATIONS

In-place Augmented Reality. Hagbi et al. IEEE International Symposium on Mixed and Augmented Reality. pp. 135-138. Sep. 2008. (4 pgs).

Website. Post Reality. The Glimpse Group. Retrieved from https://www.postreality.io. Accessed on or before Mar. 2, 2021. (2 pgs).

Non-Final Office Action issued in U.S. Appl. No. 17/233,043. May 25, 2022 (12 pgs).

Notice of Allowance issued in U.S. Appl. No. 17/233,043. Oct. 26, 2022 (11 pgs).

Notice of Allowance issued in U.S. Appl. No. 18/112,444 dated Feb. 16, 2024 (11 pgs).

* cited by examiner

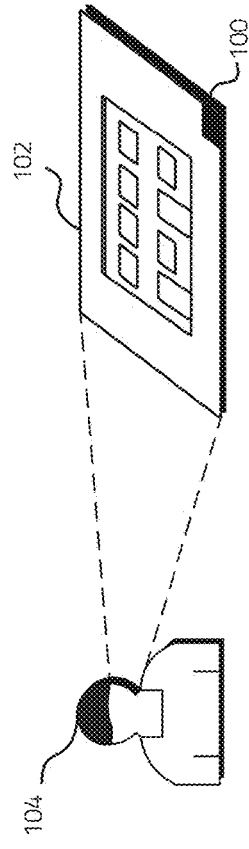
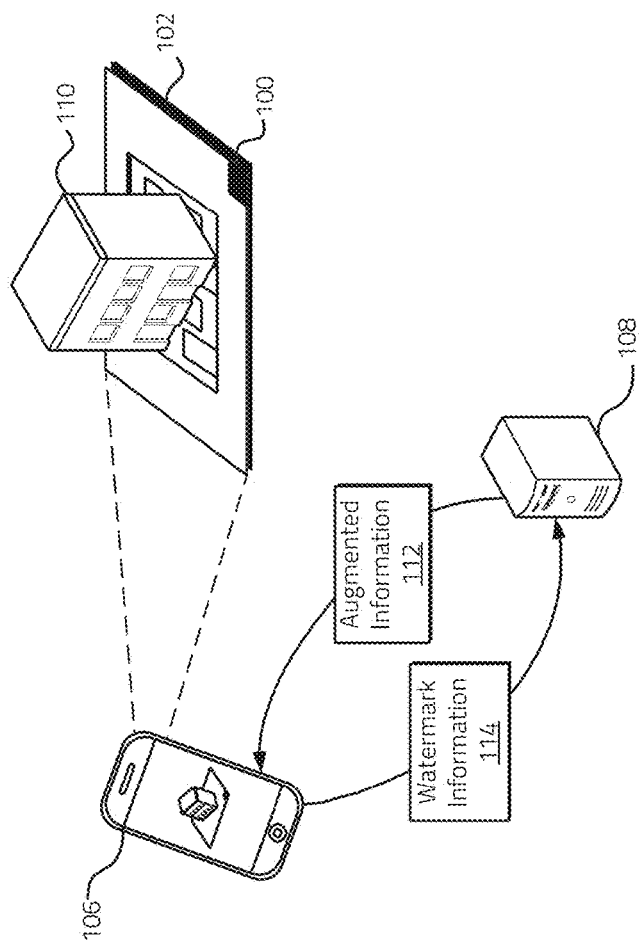

SECURE CONTENT AUGMENTATION SYSTEMS AND METHODS

RELATED APPLICATION

This application is a continuation of U.S. patent application Ser. No. 18/112,444, filed Feb. 21, 2023, and entitled "SECURE CONTENT AUGMENTATION SYSTEMS AND METHODS," which is a continuation of U.S. patent application Ser. No. 17/233,043, filed Apr. 16, 2021, and entitled "SECURE CONTENT AUGMENTATION SYSTEMS AND METHODS," which claims the benefit of priority under 35 U.S.C. § 119(e) to U.S. Provisional Patent Application No. 63/011,590, filed Apr. 17, 2020, and entitled "AUGMENTED PHOTOGRAPH SYSTEMS AND METHODS," the contents of which are all hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for augmenting content. More specifically, but not exclusively, the present disclosure relates to systems and methods for securely augmenting content, which may comprise 2-dimensional ("2D") content (e.g., a photograph, an identification card, etc.), using a watermark that contains supplemental information and/or information that may be used to retrieve supplemental information.

Conventional image content, including photographs, may store relatively limited information. For example, conventional photographs may comprise static 2D images capturing a snapshot of an event occurring within three-dimensional ("3D") space. An individual viewing the photograph may only be provided with a single point of view of the captured event and may not be readily able to obtain further detail and/or perspectives without viewing additional photographs. When multiple photographs are captured and viewed together, a viewing individual may need to place them in proper sequence and/or context to better understand an actual event in question.

Conventional image content may further lack interactivity, as individuals may not interact with photographs in the same way that they interact with the physical world and/or with certain digital images on a computer. For example, an individual may not be able to zoom in or out with a conventional photograph, rotate around the subject of the photograph, and/or see an animated version of the photograph.

Conventional photographs may, in some circumstances, be used as a form of identification. For example, a photograph may be included on an identification card associated with an individual. Conventional photographs used as a form of identification, however, may introduce challenges when two individuals resemble one another. Using photographs in identification cards to authenticate an individual's true identity may also be prone to error, especially if the individual's appearance has changed (e.g., weight gain, hairstyle changes, etc.). Furthermore, the lack of an ability to zoom into a conventional photograph may make it more difficult to scrutinize and differentiate facial features depicted in photographic identification.

In some circumstances, photographs may be captured of private individuals and/or events. It may be desirable for such photographs to not be distributed widely and/or otherwise be distributed in a controlled manner. A conventional photograph, however, is a static image that allows an individual possessing the photograph to access all its depicted information without privacy controls.

Consistent with embodiments disclosed herein, a variety of techniques for augmenting and/or otherwise supplementing content using watermarks are described. In some embodiments, a watermark may include and/or otherwise encode information. Using a device (e.g., a smartphone with a camera system and/or the like), a user may retrieve information encoded in the watermark. For example, in some embodiments, a camera system associated with a device may be used to capture image information associated with a watermark.

The encoded information, which may be generally referred to herein in certain instances as watermark information, may comprise content that augments and/or otherwise supplements content associated with the watermark. In further embodiments, the encoded information may comprise a link and/or other identification information that may be associated with a location and/or a service where a device may access augmenting and/or supplemental content. In various embodiments, a device used to access watermark information may exchange authentication credentials with a service to retrieve the augmenting and/or supplemental content. Upon receiving valid credentials and confirming authorization to view supplemental content, the service may provide the supplemental content and/or the cryptographic keys and associated rights to the device to securely control access to the supplemental content.

A variety of watermarks may be used in connection with various aspects of the disclosed embodiments. In some embodiments, watermarks may be perceivable and/or otherwise visible when viewing the watermark. In further embodiments, however, the watermark may not be perceivable and/or otherwise visible to a user's naked eye, but may be able to be detected by a system of a device (e.g., a camera system and/or the like). Watermarks may be bound to associated content, potentially tightly and/or securely, and/or may comprise unbound and/or otherwise discrete watermarks.

Information encoded within watermarks may, in some embodiments, be encrypted and/or otherwise protected. For example, to access encrypted watermark information in the clear, a device may be required to decrypt the encrypted watermark information using a cryptographic key (e.g., decrypting the watermark information by the device directly and/or by interacting with another system and/or service). In further embodiments, watermark information may be unencrypted. In yet further embodiments, watermark information may comprise a cryptographic key, which may or may not be encrypted itself, that may be used in connection with various cryptographic operations and/or applications.

In at least one non-limiting example implementing various embodiments disclosed herein, photographs may be augmented with a watermark and/or other information that may contain information regarding augmented information and/or otherwise associated with the photograph. For example, in some embodiments, a watermark included on a photograph may include information about a 3D version of the photograph, 3D versions of objects included in the photograph, and/or higher resolution versions of the photograph and/or other supplemental content information. When a user of an augmented reality ("AR") device views an augmented photograph consistent with embodiments disclosed herein, the device may render the 3D image in space over the 2D static photograph image (e.g., virtually superimposed over a view of static image in a display of the device and/or in a projection generated by the device), may provide access to the higher resolution version of the photograph, and/or display the supplemental content information. It will be appreciated, however, that various embodiments disclosed herein may be implemented in connection with a wide variety of other use cases, contexts, architectures, and/or applications.

BRIEF DESCRIPTION OF THE DRAWINGS

The inventive body of work will be readily understood by referring to the following detailed description in conjunction with the accompanying drawings, in which:

FIG. 1a illustrates an example of a user viewing a photograph augmented with watermark information consistent with certain embodiments of the present disclosure.

FIG. 1b illustrates an example of a user viewing a photograph including a watermark using a user device providing augmented reality functionality consistent with certain embodiments of the present disclosure

DETAILED DESCRIPTION

Figure 2A:
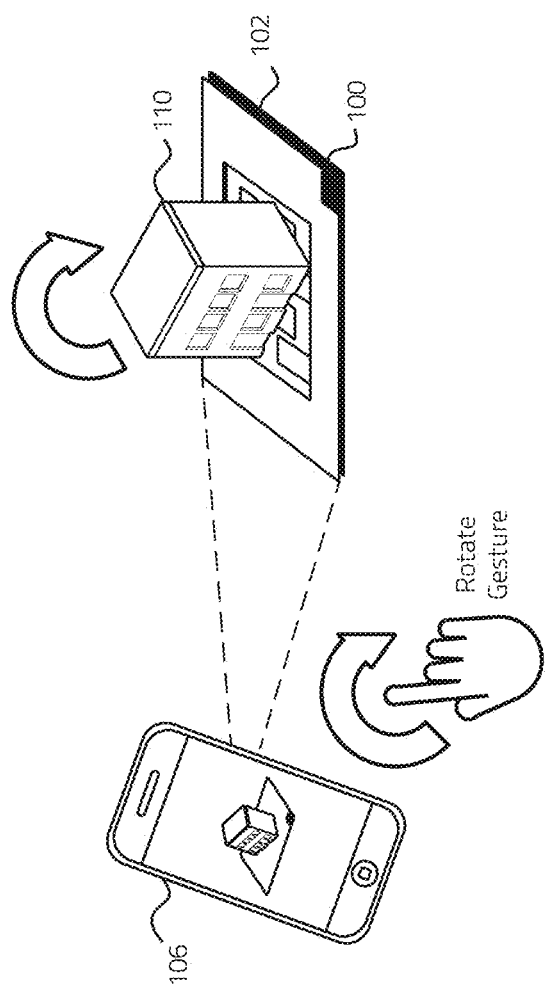
FIG. 2a illustrates an example of gesture-based interactive control of augmenting information associated with a photograph consistent with certain embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods may provide a variety of techniques for augmenting and/or otherwise supplementing content using watermarks. Consistent with embodiments disclosed herein, using a device such as, for example and without limitation, a smartphone device, a user may retrieve watermark information encoded in a watermark. The watermark information may comprise content that supplements an associated photograph and/or other content item (e.g., an identification card and/or the like), link and/or location information that may be used to retrieve content that supplements the photograph and/or other content item, cryptographic information, and/or the like. As described in more detail below, embodiments of the disclosed systems and methods may employ secure watermarks in a variety of applications, contexts, and/or use cases, including for example and without limitation, photograph augmentation, supplementing additional content and/or information with an identification card, various cryptographic content operations, and/or the like.

Watermarks and Watermark Security

A variety of watermarks may be used in connection with various aspects of the disclosed embodiments. In various disclosed embodiments, watermarks may be associated with other content such as, for example and without limitation, a photograph, an identification card, a document, and/or the like. Although various embodiments and/or examples may be described herein as using a watermark to associate supplemental information with a photograph and/or identification card, it will be appreciated that variety of other types of content, documents, and/or the like may be used in connection with the various watermarking techniques disclosed herein and/or aspects thereof. Moreover, it will be further appreciated that certain aspects of the disclosed systems and methods may not necessarily be employed in connection with watermarking photographs, identification cards, documents, and/or other content, but may be alternatively and/or additionally be used in other contexts such as access control and/or rights management systems and/or services.

In some embodiments, watermarks may comprise discrete watermarks and/or otherwise be separate from associated content. For example and without limitation, a watermark may be printed and/or displayed in a corner of a photograph and/or an identification card. In further embodiments, watermarks may be integral to associated content. For example and without limitation, a watermark may be printed and/or displayed over a photograph and/or an identification card.

In some embodiments, watermarks may be perceivable and/or otherwise visible when viewing the watermark. In further embodiments, a watermark may not be perceivable and/or otherwise visible to a user's naked eye, but may be able to be detected by user device. Watermarks may be bound to associated content, potentially tightly and/or securely (e.g. via an algorithm based on visual characteristics and/or in conjunction with cryptographic functions), and/or may comprise unbound and/or otherwise discrete watermarks.

Watermarks may encode a variety of watermark information. In some embodiments, watermark information may comprise supplemental and/or augmenting information. In further embodiments, the watermark information may comprise a link and/or other identification information that may be associated with a location and/or a service where a device may access augmenting and/or supplemental content and/or other information.

In various embodiments, watermark information may comprise information that may be used to redeem other information and/or request other information (e.g., tokens). Watermark information may further comprise cryptographic information such as, for example and without limitation, cryptographic keys that, in some implementations, may be used to decrypt supplemental content and/or other information. In some embodiments, watermark information may comprise rights objects that may bind access permissions with encrypted key material such that authorized software may decrypt encrypted key material to use to access the supplemental content in accordance with the associated rights and/or permissions.

Information encoded within watermarks may, in some embodiments, be encrypted and/or otherwise protected. For example, to access encrypted watermark information in the clear, a device may be required to decrypt the encrypted watermark information using a cryptographic key (e.g., decrypting the watermark information by the device directly and/or by interacting with another system and/or service). In further embodiments, watermark information may be unencrypted and/or otherwise in the clear. In yet further embodiments, watermark information may comprise a cryptographic key, which may or may not be encrypted itself, that may be used in connection with various cryptographic operations and/or applications. For example, in some embodiments, and as discussed in more detail below, watermark information may comprise an encrypted key that may be decrypted using another key (e.g., a key associated with and/or stored by the device and/or another service, a key retrieved by the device from a service, a key retrieved by a device from the content associated with the watermark (e.g., such as from a near field communication ("NFC") chip included on an identification card).

In some embodiments, watermarks may be static in nature. For example, a watermark embedded within an image may be physically associated with the image and may thus be relatively static. In further embodiments, watermarks (and/or associated content items) may be dynamic in nature and may be updated and/or changed over time. For example and without limitation, a watermark may be displayed via a dynamic display system and/or component associated with content, an identification card, a document, and/or some other type of content and/or item.

As discussed above, certain watermarks may be relatively easy to visually identify on an image. In some circumstances, such watermarks may be read by a device with relatively high reliability. Certain visible watermarks, however, may also be relatively easy to tamper with, remove, replace, copy, and/or alter. Information encoded within and/or accessible using such watermarks may also be suspectable to access via unauthorized duplication of an image, as they may survive copying at relatively low-resolution and/or via digital photography.

Watermarks offering potentially greater security may be embedded and/or hidden within associated content (e.g., an image) in a manner which is difficult to detect without knowledge of the technique and/or algorithm used to place the watermark and/or read the information encoded in the watermark. In some embodiments, such watermarks may be embedded multiple times within content (and/or using multiple watermarking techniques) for redundancy and/or additional resistance to tampering.

In some embodiments, a watermark may include information relating to content associated with the watermark (e.g., an image in which the watermark is embedded). Such a watermark may be relatively difficult to remove from an encompassing image without altering the image significantly and/or in an otherwise detrimental manner. Likewise, if such a watermark were to be copied and incorporated into a different image (e.g., as in the case of an attempt to produce a fraudulent association with another image and/or a forged identification card), an incorrect association between image characteristics and the data encoded in the watermark may be detected. In further embodiments, a watermark may be made resistant to tampering of the information encoded within the watermark in a manner which would destroy a relationship with an associated image and/or other content. In some embodiments, watermarks may be embedded in a manner that allows a watermark to withstand copying of associated content or embedded in a way such that a copy of the content and/or the associated watermark renders the content and/or associated watermark unusable and/or altered from the original.

In some embodiments, watermarks and/or associated watermark information may be protected by other watermarks and/or other data and/or information (e.g., data provided by an NFC chip included on content the watermark is associated with). In at least one non-limiting example, a cryptographic hash of a visually identifiable and/or readable first watermark may be protected by embedding a hashed and/or encrypted version of the watermark information in one or more other second watermarks associated with content that are more difficult to detect and/or remove. Comparing a hash of the first watermark information with a hash retrieved from one or more of the second watermarks may reveal inconsistences that may be indicative of tampering and/or unauthenticity.

User Devices and Service Systems

Watermark information may be read and/or otherwise retrieved from a watermark by a user device and/or an associated subsystem and/or component of a user device. For example and without limitation, in some embodiments, a camera system associated with a device may be used to capture a watermark and/or associated encoded watermark information. It will be appreciated, however, that a variety of other subsystems and/or components of a user device may be used to capture, retrieve, and/or otherwise read watermark information.

A variety of user devices may be used in connection with various aspects of the disclosed embodiments. A user device may comprise, for example and without limitation, one or more laptop computer systems, desktop computer systems, mobile devices, smartphones, table computers, augmented reality ("AR") glasses, virtual reality ("VR") headsets and/or other devices, photo scanners, near field reader devices, wireless transceiver devices, and/or any other type of suitable computer system and/or device. In some embodiments, a user device may execute trusted software for authenticating a user of the device, evaluating a user's authorization to view information (e.g., watermark information and/or associated retrieved information), evaluating and/or enforcing policies associated with information access, secure storage and/or management of cryptographic keys, unique identifiers, and/or the like. User devices may further comprise one or more secure execution environments, trusted execution environments ("TEE"), secure processing units ("SPUs"), and/or any other suitable secure execution spaces. Although described generally herein as a user device for purposes of illustration and explanation, it will be appreciated that a user device may comprise a device associated with a system and/or service and not necessarily with a particular user.

Consistent with embodiments disclosed herein, a user device may interact with a service system, which in certain instances may comprise a network accessible service system, in connection with various watermark operations. In some embodiments, the service system may further interact with one or more other services and/or devices. The service system may comprise, for example and without limitation, one or more laptop computer systems, desktop computer systems, server computer systems, distributed computer systems, and/or any other type of computing system and/or device.

The service system may provide a variety of operations and/or functions including, for example and without limitation, storing, management, and/or provisioning of supplemental content information, access control, authentication, and/or rights management associated with interactions with supplemental content information, key provisioning services, cryptographic services (e.g., encryption and/or deception services), policy enforcement and/or management, and/or the like. Although various embodiments disclosed herein describe a service system as being separate from a user device, it will be appreciated that in further embodiments, various functionality of a user device and/or a service system may be integrated in a single device, system, and/or service, and/or any suitable combination of devices, systems, and/or services.

The user device, service system, and/or one or more other associated systems and/or services may comprise a variety of computing devices and/or systems, including any computing system or systems suitable to implement embodiments of the various systems and methods disclosed herein. In certain embodiments, the user device, service system, and/or one or more other associated systems and/or services may comprise at least one processor system configured to execute instructions stored on an associated computer-readable storage medium. As discussed in more detail below, the user device, service system, and/or other associated systems and/or services may further comprise a TEE and/or a SPU that may be configured to perform sensitive operations such as trusted credential and/or key management, secure policy and/or rule enforcement and/or management, and/or other aspects of the systems and methods disclosed herein.

The user device, service system, and/or other associated systems and/or services may further comprise software and/or hardware configured to enable electronic communication of information between the device, service, and/or other services and/or systems via a network using any suitable communication technology, standard, and/or combinations thereof. The user device, service system, and/or other associated systems and/or services may be communicatively coupled using a variety of networks and/or network connections. In certain embodiments, the network connections may comprise a variety of network communication devices and/or channels and may utilize any suitable communications protocols and/or standards facilitating communication between the user device, service system, and/or other systems and/or services.

The network connections may comprise Internet, a local area network, a virtual private network, and/or any other communication network connections utilizing one or more electronic communication technologies and/or standards (e.g., Ethernet or the like). In some embodiments, the network connections may comprise a wireless carrier system such as a personal communications system ("PCS") and/or any other suitable communication system incorporating any suitable communication standards and/or protocols. In further embodiments, the network connections may comprise an analog mobile communications network connections and/or a digital mobile communications network connections utilizing, for example and without limitation, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and/or any other suitable standard or standards.

Supplemental and/or Augmenting Information

Various types of supplemental information and/or content, which in certain instances herein may be described as augmented information and/or content and/or augmenting information and/or content, may be encoded within and/or otherwise be associated with a watermark consistent with embodiments disclosed herein (e.g., associated with content via link information, location information, and/or the like). Certain types of supplemental information may not involve security protections including, for example and without limitation, metadata associated with associated image content, metadata and/or description information associated with the image content and/or an individual appearing the image content that may be discernable from the content (e.g., hair color, eye color, gender, etc.), and/or the like. In some embodiments, this type of information may be associated with and/or otherwise encoded within a watermark having a relatively low level of security.

Other supplemental information, however, such as, for example and without limitation, AR and/or VR data, video content, 3D facial recognition data, image transformation data (e.g., automated age progression data, tattoo simulation and/or removal data, hair color and/or hair style transformation data, height data, weight data, fingerprint data), and/or the like, may be encoded within (and/or linked by) watermarks and/or associated service systems employing a relatively higher-level of security. As discussed in more detail below, access to such higher security information may, in some embodiments, use locally retrieved information from associated content as part of the security protection mechanisms (e.g., information retrieved from an NFC chip integrated into a content item while in proximity to a user device and/or the like).

Watermarking Photographs with Augmenting Information

Consistent with various embodiments of the disclosed systems and methods, 2D photographs may be supplemented and/or otherwise augmented with a watermark and/or other information that may contain information about supplemental information regarding and/or otherwise associated with the photograph. Although various embodiments are described herein as using a watermark to augment a photograph, it will be appreciated that a variety of other methods for augmenting a photograph may also be used.

FIG. 1a illustrates an example of a user 104 viewing a photograph 102 supplemented with watermark information 100 consistent with certain embodiments of the present disclosure. In some embodiments, the watermark 100 may be perceivable and/or otherwise visible when viewing the photograph 102. In further embodiments, however, the watermark 100 may not be perceivable and/or otherwise visible to a user's naked eye when viewing the photograph 102, but may be able to be detected by an imaging system of an AR device such as a smart phone and/or an AR and/or VR-equipped wearable device.

FIG. 1b illustrates an example of a user viewing a photograph including a watermark 100 using a user device 106 providing AR functionality consistent with certain embodiments of the present disclosure. The watermark 100 may encode augmenting and/or supplemental information associated with the photograph. For example, in some embodiments, a watermark 100 included on a photograph 102 may include information about a 3D version of the photograph and/or 3D versions of objects 110 included in the photograph. When a user of the smartphone device 106 providing AR services views the augmented photograph 102 consistent with embodiments disclosed herein, the device 106 may render the 3D image and/or object 110 in space over the 2D static photograph image (e.g., virtually superimposed over a view of a static image in a display of the device 106). Although various embodiments of the disclosed watermarks 100 are described herein as encoding 3D information (and/or link/location information for accessing associated 3D information), it will be appreciated that a variety of other types of supplementary information may be encoded in a watermark consistent with the disclosed embodiments.

In some circumstances, a watermark 100 may encode and/or otherwise include a limited amount of information. Accordingly, in some embodiments, the watermark 100 may encode and/or otherwise include a link and/or otherwise identify a location where a device 106 may access augmenting and/or supplementing information associated with the photograph 102. In further embodiments, the watermark 100 may include information that the device 106 may use to access information from an augmented information service.

For example, as illustrated in FIG. 1b, a watermark 100 may encode information identifying a service 108 providing supplemental information. The watermark 100 may further include information that the user device 106 may use to access supplemental information associated with the photograph 102 from the service 108. Using the watermark information 114, the device 106 may issue a request for the augmented information associated with the photograph 102 to the service 108. Based on the information included in the received request, the service 108 may access the augmented and/or supplemental information 112 associated with the watermark 100 and/or photograph 102 and return it to the user device 106. The user device 106 may then render the supplemental information to the user (e.g., by rendering a 3D image 110 in space over the 2D static photograph image 102 and/or the like).

In some embodiments, security techniques may be employed by the user device 106 and/or the service system 108 to ensure only authorized users are permitted to access to supplemental information 112 such as 3D rendering information. For example, a photographer may set permissions on a photograph 102 and only allow those with password access to view supplemental information 112 associated with the 2D image such as 3D rendering information. A user possessing the photograph 102 may view the 2D printed image, but may not view the supplemental information 112 and/or 3D rendering information with their device 106 without first authenticating access (e.g., by entering a correct password via the device 106 and/or the like).

In certain embodiments, access control security may be enforced by the user device 106. In further embodiments, access control security may be enforced by the service system 108 in connection with responding to access control requests issued by a user device 106.

In some embodiments, as discussed in more detail below, augmented information 112 may be stored and/or provisioned to a user device 106 in an encrypted format by the information service. The watermark 100 may comprise key information that may be used to decrypt the augmented information 112. In certain embodiments, the key information may be communicated to the service system 108 and be used by the information service to decrypt the augmented information prior to transmitting the information to the user device 106. In further embodiments, the service system 108 may communicate the encrypted augmented information to the user device 106 and the device may use key information included in the watermark 100 (and/or otherwise stored by the user device 106) to decrypt the received augmented information.

Interaction with Supplemental Information

Various embodiments disclosed herein may enable a variety of dynamic user interactions with watermarked photographs. For example, using an AR device and watermark information included in a photograph, a user may be able to zoom in and out of augmented photograph information, rotate a viewing perspective around a subject of a photograph, rotate a 3D rendering of the subject of a photograph, and/or view an animated version of the photograph. In some embodiments, gesture-based controls may be used to facilitate interaction with augmented photograph information.

Figure 2B:
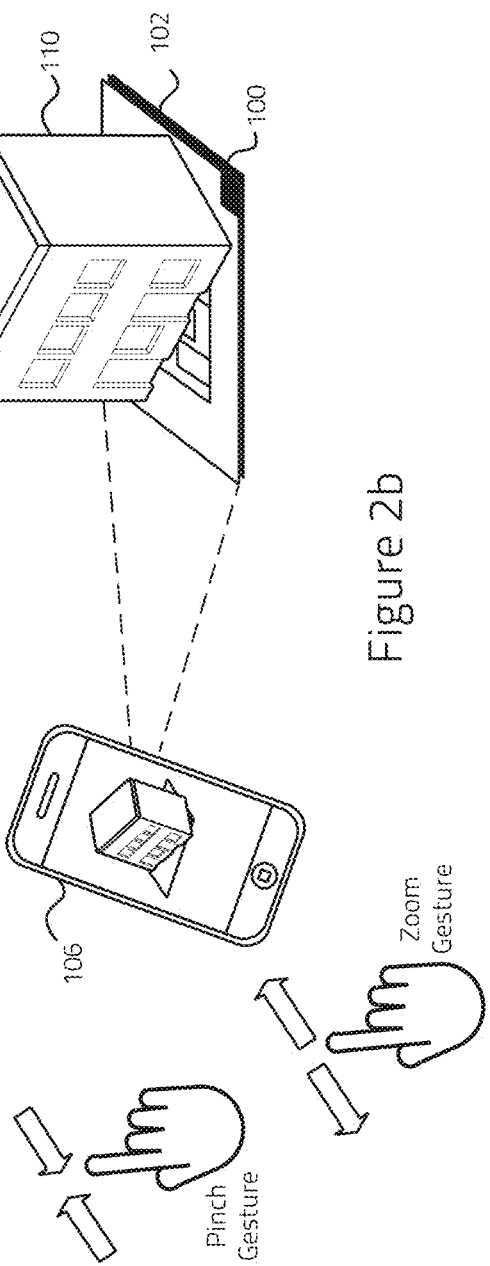
FIG. 2b illustrates another example of gesture-based interactive control of augmenting information associated with a photograph consistent with certain embodiments of the present disclosure.

FIGS. 2a-2b illustrate examples of gesture-based interactive control of augmenting information associated with a photograph 102 consistent with certain embodiments of the present disclosure. Such gesture-based controls may include, for example and without limitation, one or more of:

Zoom and Pinch—Using zoom and pinch gestures, a user may enlarge and/or narrow augmenting information associated with the photograph 102 and/or areas of the photograph itself.

Rotate—Using a rotate gesture, a user may view augmenting information associated with a backside of an object included in a photograph 102 (e.g., the back of a subject's head), rotate a 3D representation of an object 110 included in the photograph, and/or the like.

Animate—Using an animate gesture, a user may play a 3D moving rendering which can show movements in a scene shown in a photograph 102 captured by a capturing device.

Augmenting information may be generated and/or otherwise captured in a variety of ways. For example, to capture panoramic view augmented information, a photographer may rotate a camera around a single point to capture a 360-degree view of a location. In another example, to capture certain 3D images, a photographer may rotate a camera around an object (e.g., a person's head) until multiple perspectives of the object have been captured.

Embodiments of the disclosed systems and methods may be employed in a variety of applications, contexts, and/or use cases. In a first non-limiting example, a couple may take a photo of a family outing using a panoramic photo application. They can either print the photo on a piece of paper or view it on a computer screen. In either case, when they view the image through an AR device, the device may render a 3D image associated with the photo. Using gesture-based controls, the couple may interact with the image to see it from multiple perspectives that were captured by the panoramic photo application.

In another non-limiting example, a suspicious individual may attempt to pass a security checkpoint. A security guard may view the individual's photograph on an ID card. Without using an AR device, the suspicious individual may look similar to hundreds of other similar looking people. However, using an AR device, the security guard can access watermark information to view a 3D view of the individual that they can zoom in on and/or otherwise enhance. The security guard may notice that the suspicious individual has different features that the individual associated with the ID card, and may thus stop the suspicious individual from using the likely stolen card.

In yet another non-limiting example, a group of coworkers may attempt to document the results of a meeting. They may wish to share their notes from the meeting without fear of trade secret theft. Photographs of their notes may be encrypted with a passcode and access may be restricted to only the members of the team and/or others with access permissions.

Managing Access Authorization to Supplemental Information

In various disclosed embodiments, access to supplemental information and/or content may be managed using authentication processes implemented by the device and/or one or more services. For example, in some embodiments, a device may read watermark information encoded in watermark and exchange authentication credentials with a service to retrieve associated supplementary information. By managing the distribution of supplementary information using authentication processes, a service may operate to ensure that only authorized users and/or devices are granted access to protected and/or otherwise secure supplemental information.

Figure 3:
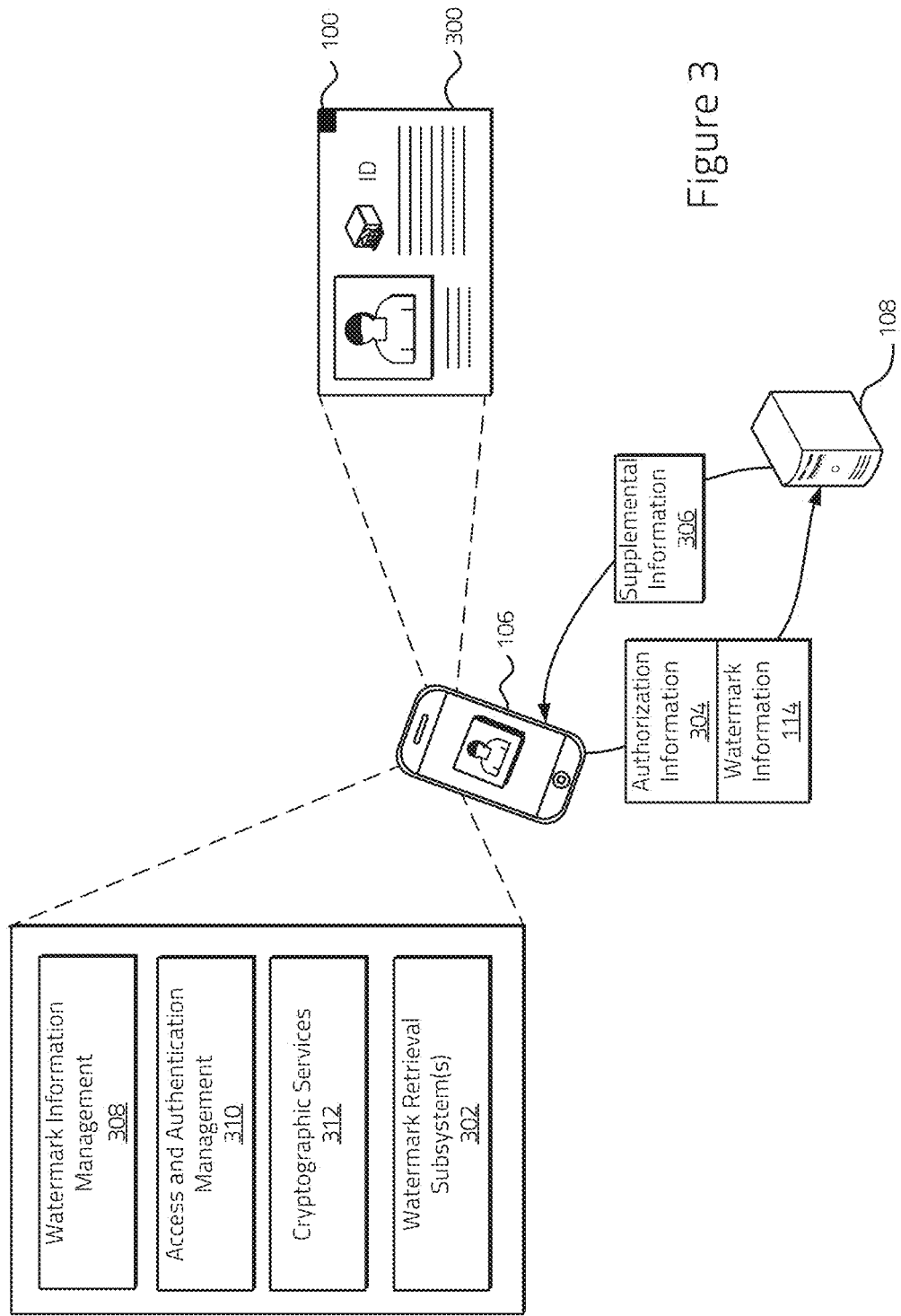
FIG. 3 illustrates an example of authenticating access to supplemental information associated with content by a device through interacting with a service consistent with certain embodiments of the present disclosure.

FIG. 3 illustrates an example of authenticating access to supplemental information 306 associated with content by a device 106 through interacting with a service 108 consistent with certain embodiments of the present disclosure. In certain embodiments, various watermarking techniques described herein may be used in connection with content comprising an identification card 300. The identification card 300 may comprise, for example and without limitation, a photograph of an individual, various characteristics associated with the individual (e.g., height, weight, hair color, eye color, gender identity, name, address, etc.), certain rights and/or authorizations associated with the individual, and/or the like.

Consistent with embodiments disclosed herein, the identification card 300 may further comprise one or more watermarks 100. In some embodiments, one or more watermarks may be embedded and/or otherwise included in a photo printed on an identification card 300 and/or otherwise be integral and/or embedded in information included on the card 300. In further embodiments, the identification card 300 may comprise one or more discrete watermarks that may be printed on the card 300 separately from other information (e.g., separate from photographs and/or other information).

In some embodiments, as discussed in more detail below, the identification card 300 may comprise one or more wireless presence indicating components. For example, the identification card 300 may comprise a relatively short-range presence indicating component such as, for example and without limitation, radio-frequency identification ("RFID") and/or NFC responders and/or chips that, in some instances, may comprise secure elements. In further embodiments, other wireless technologies may be employed for presence and/or proximity detection and/or determination including, for example and without limitation, WiFi, Bluetooth®, UWB beacons, Zigbee®, and/or the like. In certain embodiments, the identification card 300 may further comprise storage, which may be used to store encrypted identification and/or supplemental information, secure storage, which may be used to securely store keys, device identifiers, user identifiers, supplemental information, and/or the like, one or more secure elements for cryptographic processing (e.g., associated with NFC communication components), and/or the like.

The device 106 may read, retrieve, and/or otherwise capture the watermark 100 and/or associated encoded watermark information using one or more watermark retrieval subsystems 302 of the device 106. In some embodiments, a camera may be used to capture the watermark 100 and/or associated encoded watermark information, although other types of watermark retrieval subsystems 302 may also be used by the device 106.

In some embodiments, watermark information management services 308 executing on the device 106 may extract watermark information 114 from the watermark 100 captured by the device 106. For example, in some embodiments, watermark information management services 308 may decode encoded watermark information 114 from a watermark 100 captured by the device 106 (e.g., decode in accordance with a defined and/or recognized encoding and/or decoding method). Watermark information management services 308 may extract watermark information 114 from the decoded watermark information that may be used to retrieve supplemental information associated with the watermark from a service system 108. For example and without limitation, in some embodiments, watermark information management services 308 executing on the device 106 may use decoded information from a watermark 100 to identify a particular service system 108 and may communicate watermark information 114 included in the decoded information to the service system 108 that may be used to identify and/or otherwise retrieve associated supplemental information 306.

Consistent with embodiments disclosed herein, in some embodiments, access and/or authentication management services 310 executing on the device 106 may further communicate authorization and/or authentication information 304 and/or other rights information to the service system 108 in connection with a request to retrieve specific supplemental information 306 associated with a watermark 100.

For example, in some embodiments, a user and/or device 106 may provide user and/or device access credentials (e.g., a username and/or password), biometric credentials, access tokens, and/or the like to the service system 108 as authorization information 304 in connection with a request to retrieve supplemental information 306 associated with a watermark 100. The service system 108 may authenticate the request by examining the authorization information 304 proffered by the device 106 in connection with the request to determine whether the associated user and/or device has rights and/or authorization to access the supplemental information 306 associated with the watermark information 114. In some embodiments, the authorization information 304 may comprise one or more keys associated with the device 106, an associated user, and/or cryptographic services 312 associated with the device that may be used by the service system 108 to decrypt encrypted supplemental information associated with a request and/or watermark 100 before returning the information to the device 106.

If the user and/or device 106 has requisite rights and/or authorization, the service system 108 may return the supplemental information 306 to the device 106. Using the device 106, a user may view the supplemental information 306, potentially in connection with the identification card 300 (e.g., overlaid on a display of the device 106). In at least one non-limiting example, the supplemental information 306 may comprise higher resolution photograph information associated with the identification card 300, allowing a user to examine certain user characteristics in more detail (e.g., using zooming operations and/or the like). In further embodiments, the supplemental information 306 may comprise confidential and/or otherwise restricted information about an individual associated with the identification card 300 (e.g., prior criminal history and/or records, banking information, electronic travel history, and/or the like). It will be appreciated that a variety of types of supplemental information 306 may be used in connection with various aspects of the disclosed embodiments, including any of the types of supplemental and/or augmenting information described herein, and that any suitable type of supplemental and/or augmenting information may be employed in connection with the disclosed embodiments, which may vary depending on a particular application, context, and/or use case.

In certain embodiments, supplemental information 306 provided to a device 106 by the service system 108 may be encrypted. The encrypted supplemental information 306 may be decrypted by the device 106 using a decryption key associated with the user, device 106, and/or cryptographic services 312 executing on the device 106. Once decrypted, the supplemental information 306 may be displayed by the device 106 and/or otherwise accessed by an associated user. In some embodiments where returned supplemental information 306 communicated to the device 106 from the service system 108 is encrypted, the device 106 may not necessarily provide authorization information 306 to the service system 108 in connection with a request. Authenticated access control to the supplemental information 306 may be still be maintained to a degree in such an implementation, however, as only devices and/or users possessing requisite cryptographic keys may decrypt the returned supplemental information 306.

Encrypted Watermark Information

In some embodiments, information encoded in a watermark may be encrypted and/or otherwise protected in a manner such that to decrypt and/or decode the encoded watermark information, a user device may need to possess one or more associated decryption keys. Managing distribution, access, and/or use of the associated decryption keys may thus be used to manage access to associated watermark information.

Figure 4:
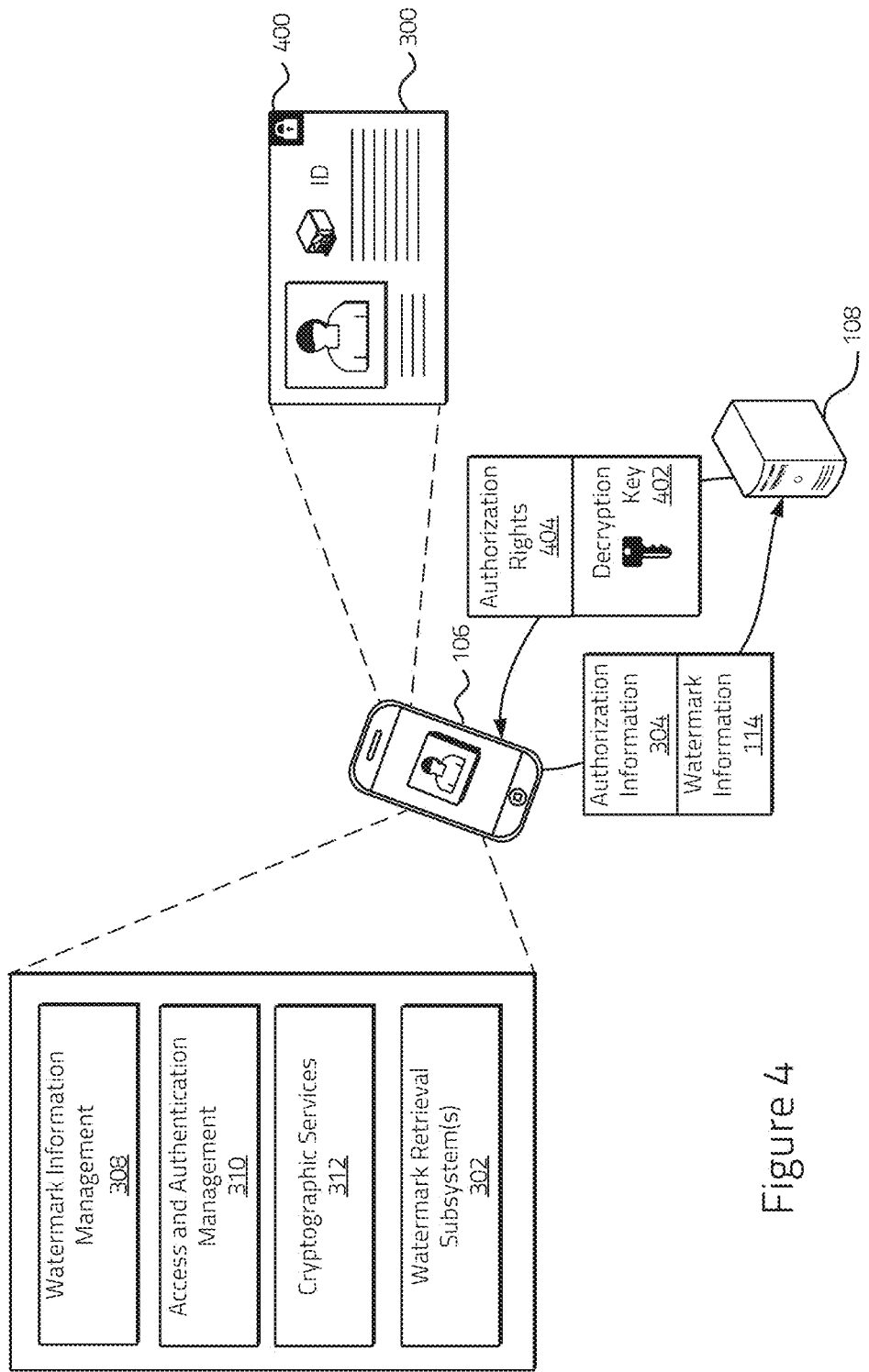
FIG. 4 illustrates an example of an interaction with a watermark including encrypted information consistent with certain embodiments of the present disclosure.

FIG. 4 illustrates an example of an interaction with a watermark 400 including encrypted information consistent with certain embodiments of the present disclosure. In some embodiments, the watermark 400 may be associated with an identification card 300, although other types of associated content may also be used in connection with the disclosed embodiments. The watermark 400 may be embedded and/or otherwise included in content printed on the identification card (e.g., a photo) and/or may comprise a discrete watermark, potentially in a specific location on the identification card 300.

In some embodiments, the watermark 400 may encode supplemental information associated with the identification card 300 in an encrypted form. The device 106 may read, retrieve, and/or otherwise capture the watermark 400 and/or associated encoded encrypted supplemental information using one or more watermark retrieval subsystems 302 of the device 106. For example and without limitation, in some embodiments, a camera may be used to capture the watermark 400 and/or associated encoded encrypted supplemental information.

In some embodiments, the watermark 400 may further encode watermark information 114 that may be used to identify, retrieve, and/or otherwise access certain rights objects and/or keys associated with the encrypted supplemental information encoded within the watermark 400. For example, the watermark information 114 may comprise information identifying a service system 108 where a device 106 may retrieve decryption keys and/or other rights objects associated with the encrypted supplemental information. Watermark information management services 308 executing on the device 106 may extract such watermark information 114 from the watermark 400 captured by the device 106. The watermark information management services 308 may use the decoded information from a watermark 400 to identify a particular service system 108 and may communicate the watermark information 114 included in the decoded information as part of a request to the service system 108 to access keys used to decrypt the encrypted supplemental information encoded in the watermark.

In various embodiments, access and/or authentication management services 310 executing on the device 106 may further communicate authorization and/or authentication information 304 and/or other rights information to the service system 108 in connection with the request. For example, in some embodiments, a user and/or device 106 may provide user and/or device access credentials (e.g., a username and/or password), biometric credentials, access tokens, and/or the like to the service system as authorization information 304 in connection with a request issued to the service system 108. The service system 108 may authenticate the request by examining the authorization information 304 proffered by the device 106 in connection with the request to determine whether the associated user and/or device has rights and/or authorization to access the supplemental information associated with the watermark information 114.

If the user and/or device 106 has requisite rights and/or authorization, the service system 108 may return the one or more decryption keys 402 to the device 106, potentially via an encrypted and/or otherwise protected channel established between the service system 108 and/or the device 106. The service system 108 may further provide the device with authorization rights information 404 associated with the one or more decryption keys 402 articulating one or more requirements associated with the use of the keys 402. For example and without limitation, in some embodiments, the authorization rights information 404 may comprise one or more policies associated with the use of the keys 402 by the device 106 and/or an associated user articulating associated requirements. A variety of policies may be used in connection with the disclosed embodiments including, for example and without limitation, role-based policies, time-based policies, use and/or expiration policies, and/or any other suitable type of policy.

Using the one or more decryption keys 402 and/or the authorization rights information 404, the device 106 and/or associated services may decrypt the supplemental information encoded within the watermark 400. For example, the access and authorization management services 310 and/or the cryptographic services 312 executing on the device 106 may determine whether the user and/or device 106 is authorized to use the one or more decryption keys 402 to decrypt the supplemental information encoded within the watermark 400 based on the authorization rights information 404 provided by the service system 108. If the user and/or device is authorized to use the one or more decryption keys 402, the cryptographic services 312 may decrypt the supplemental information encoded in the watermark 400 using the one or more decryption keys 402. Using the device 106, a user may view the supplemental information, potentially in connection with the identification card 300 (e.g., overlaid on a display of the device 106).

Proximity-Based Management of Supplemental Information

In certain embodiments, a watermark may comprise information that may be used to decrypt other information. For example, a watermark may be encoded with decryption key information. The decryption key information encoded within the watermark may be used to decrypt encrypted content, which may be identified based on other watermark information encoded in the watermark. In some embodiments, a decryption key encoded within a watermark may itself be protected via encryption.

Figure 5:
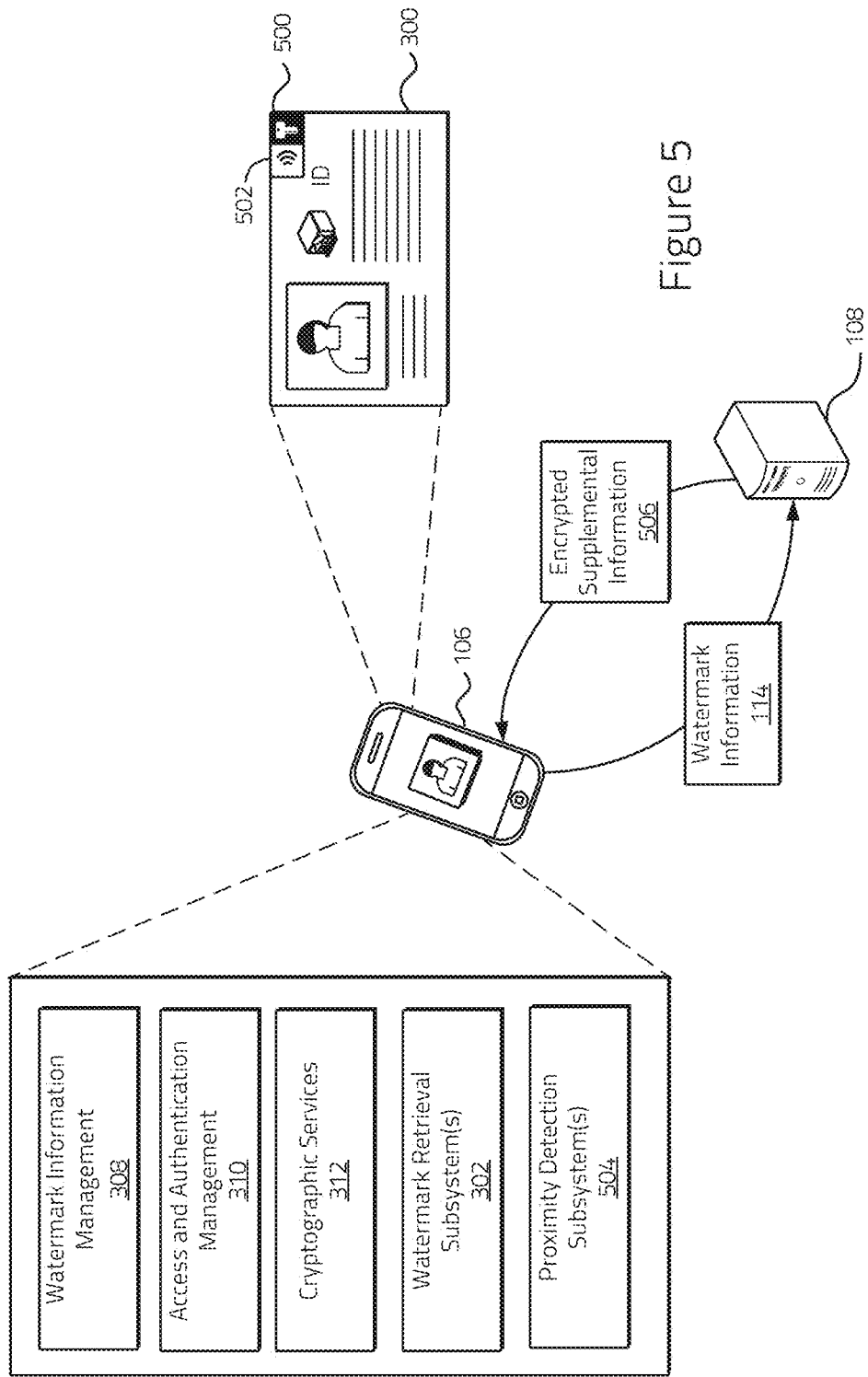
FIG. 5 illustrates an example of an interaction with a watermark including decryption information consistent with certain embodiments of the present disclosure.

FIG. 5 illustrates an example of an interaction with a watermark 500 including decryption information consistent with certain embodiments of the present disclosure. In some embodiments, the watermark 500 may be associated with an identification card 300, although other types of associated content may also be used in connection with the disclosed embodiments. The watermark 500 may be embedded and/or otherwise included in content printed on the identification card (e.g., a photo) and/or may comprise a discrete watermark, potentially in a specific location on the identification card 300.

In some embodiments, the watermark 500 may encode one or more cryptographic decryption keys that may be used to decrypt certain supplemental content. The device 106 may read, retrieve, and/or otherwise capture the watermark 500 and/or associated encoded keys using one or more watermark retrieval subsystems 302 of the device 106. For example and without limitation, in some embodiments, a camera may be used to capture the watermark 500 and/or associated encoded key information.

In some embodiments, the one or more keys encoded within the watermark 500 may themselves be encrypted using one or more other keys. In this manner, the watermark 500 and/or associated keys may be protected by other data and/or information. For example, as illustrated, the identification card 300 may comprise an embedded NFC chip 502 and/or other proximity-based electronic component enabling storage of information and/or communication of stored information from the component.

In some embodiments, the NFC chip 502 may store one or more cryptographic keys that may be used to decrypt one or more encrypted keys encoded within the watermark 500. Although various embodiments and/or examples are described herein in connection with an NFC chip 502, it will be appreciated that a variety of other proximity-based communication components and/or other systems operating in a similar manner may also be used. One or more proximity detection and/or communication subsystems 504 included in and/or otherwise associated with the device 106 may be configured to retrieve the cryptographic keys stored by the NFC chip 502 when the identification card 300 and/or the NFC chip 502 are within a threshold proximity to the mobile device 106. Using the one or more keys provided by the NFC chip 502, cryptographic services 312 executing on the device 106 may decrypt the one or more encrypted keys retrieved from the watermark 500.

In some embodiments, the watermark 500 may further encode watermark information 114 that may be used to identify supplemental content associated with the watermark 500 and/or the identification card 300. For example, watermark information 114 may encode information identifying a service system 108 where a device 106 may retrieve supplemental content associated with the watermark 500 and/or the identification card 300. Watermark information management services 308 executing on the device 106 may extract such watermark information 114 from the watermark 500 captured by the device 106. The watermark information management services 308 may use this information to identify a particular service system 108 and may communicate the watermark information 114 included in the decoded information as part of a request to the service system 108 for the associated supplemental content. Although not specifically illustrated in connection with FIG. 5, access and/or authentication management services 310 executing on the device 106 may further communicate authorization and/or authentication information and/or other rights information to the service system 108 in connection with the request.

In response to the request, the service system 108 may return encrypted supplemental information 506 corresponding to the watermark information 114 provided in the request. In embodiments where authorization and/or authentication information and/or other rights information are provided to the service system 108 in connection with the request, the service system 108 may determine whether the user and/or device 106 have requisite rights to access the encrypted supplemental information 506 prior to returning the information 506 to the device 106.

Using the one or more decrypted keys keys retrieved from the watermark 500, the cryptographic services 312 may decrypt the encrypted supplemental information 506 received from the service system. Using the device 106, a user may view the decrypted supplemental information, potentially in connection with the identification card 300 (e.g., in a manner where the supplemental information is overlaid over the identification card 300 when viewed via a display of the device 106 and/or the like).

Although in various embodiments described above the NFC chip 502 may store one or more cryptographic keys used to decrypt one or more encrypted keys encoded in the watermark 500, it will be appreciated that in other embodiments, the NFC chip 502 may store encrypted keys that may be decrypted by a key encoded in the watermark 500. For example, in some embodiments, the NFC chip 502 may store one or more cryptographic keys that may be used to decrypt supplemental content. The keys stored by the NFC chip 502 may be encrypted using one or more keys encoded in the watermark 500. By retrieving the keys encoded in the watermark 500, the user device 106 may decrypt the encrypted keys stored by the NFC chip 502 and use the decrypted keys to decrypt the encrypted supplemental information 506.

It will be appreciated that a number of variations can be made to the architecture, relationships, and examples presented in connection with FIGS. 1-5 within the scope of the inventive body of work. For example, various systems, subsystems, devices, and/or components and/or associated functionalities described above may be integrated into a single system, subsystem, device, component, and/or functional module, and/or any suitable combination of systems, subsystems, devices, components, and/or functional modules in any suitable configuration. Moreover, certain features and/or aspects shown in connection with one example of FIGS. 1-5 may be used in connection with certain features and/or aspects shown in connection with other examples shown in FIGS. 1-5. Thus, it will be appreciated that the architectures, relationships, and examples presented in connection with FIGS. 1-5 are provided for purposes of illustration and explanation, and not limitation.

Differential Watermarking

In some embodiments, watermarks having different reader and/or capture resolution requirements may be embedded within a single item of content (e.g., a single image). In such a way, a rudimentary form of "proximity sensing" may be employed using a visual identification image. For example, if a user were to hold an identification card containing a multi-watermarked image at a first distance from a device used to scan and/or otherwise read the watermarks, certain watermarks may be readable and provide access to a certain subset of low security supplemental information. Similarly, if a user were to hold the image closer to the device (or alternatively possibly by granting possession of it to another party, such as a law enforcement officer or gate attendant for purposes of scanning more closely), different watermarks may become readable, permitting access to additional supplemental information. An owner of such an identification card may control viewing access to their card in a manner that distinguishes between relatively close access and/or more distance access.

Certain circumstances may require a copy and/or scan of an identification card to be sent and/or otherwise transferred to another party for recordation and/or inspection. When scanning a copy of an identification card for such purposes, an owner of the identification card could choose to scan the card at a resolution that is low enough such that certain watermarks used to access more secure data will not be readable in the copy. In this manner, a user may manage access to supplemental data encoded within and/or otherwise accessible using certain watermark data.

Managing Access to Supplemental Information Using Presence Verification Techniques In some embodiments, an identification card may be associated with supplemental information, which in some instances may comprise AR information. As discussed above, n certain embodiments, an identification card may be configured such that one or both of information encoded in a watermark (e.g., a visual watermark) and/or information retrieved from a proximity-based wireless "mark" integrated on the identification card (e.g., provided by a near field RFID chip, an NFC chip, and/or the like) may be used to access the supplemental information. Such a configuration may provide enhanced presence and/or proximity checking capabilities in connection with watermark usage.

This combined approach of using visual watermarks in combination with proximity-based wireless communication techniques may help facilitate deployment efforts and public acceptance of next generation identification systems that employ greater interactivity and access to personally identifiable information. For example, due to a variety of factors including, but not limited to, past historical events involving oppressive governments employing extreme surveillance techniques on their citizens, fictional future dystopian novels depicting electronic tracking of individuals, and/or general distrust of governments and/or technology, many members of the public may be hesitant to use identification cards that can be passively monitored wirelessly. Moreover, in today's digital world, the ability to copy and distribute information also presents challenges to traditional identification use cases, where an individual needs to use identification information to gain access to services, yet must also keep this information as private as possible. By structuring access to information using a combination of visual proximity and wireless proximity techniques, many of these perceived risks may be mitigated.

In at least one non-limiting example, access to more personal information and/or enhanced image data such as supplemental 3D and/or AR data may be predicated on the receipt of information continued within and/or derived from a higher resolution watermark and receipt of information via a short-range wireless transmission channel from an identification card. Merely walking past and/or being in proximity to an RFID, and NFC, and/or other shorter range wireless reader and/or longer range wireless reader (e.g., UWB, WiFi, etc.) would not enable access to the supplemental information unless a user also presents their identification card for visual watermark capture. This may, in some circumstances, mitigate fears relating to passive wireless tracking and/or surveillance by governmental agencies, unauthorized third parties, malicious actors, and/or the like. Similarly, merely having a photocopy and/or a low-resolution photographic image of the identification card and/or viewing from a distance alone may not enable access to the supplementary information without also obtaining additional information wirelessly. This may help mitigate concerns relating to duplicating and/or otherwise distributing forged and/or unauthorized copies of identification cards.

In another non-limiting example, an identification card may comprise a lower resolution watermark, a higher resolution watermark, and/or a short-range wireless communication component. The lower resolution watermark may encode relatively basic and/or low security information, either encrypted (at least in part), and/or in the clear (e.g., unencrypted). The higher resolution watermark may encode a token, rights object, and/or a key required to decrypt and/or access information encoded within and/or identified by information encoded within the lower resolution watermark. The short-range wireless communication component may store and/or provide a cryptographic key that may be used to decrypt information included in one or more of the watermarks and/or a secure token that may be redeemed via a service to request time-expiring rights to view supplemental content using a certified and/or otherwise trusted viewing device and/or software module.

As discussed in various examples and/or embodiments detailed above, supplemental information may be stored and/or otherwise managed by a service system, which may comprise a network connected service system (e.g., a cloud service system and/or the like) and/or may be stored on an identification card and/or content item itself via a watermark and/or a short-range wireless communication component (e.g., an NFC chip). In some embodiments, the supplemental information may be stored as an encrypted file and/or protected via storage and/or management in secure memory.

In some embodiments, proximity of a user device and an identification card and/or other content item may be further confirmed by a wireless round trip time test. For example, a cryptographic challenge-response test may be issued for completion within a specified threshold time period. In further embodiments, proximity of a user device and an identification card and/or other content item may be confirmed using the above techniques and and/or further incorporating a reverse Turing test communicated to a current user of the user device to confirm that a human user is actively involved in the process, thereby mitigating or restricting the use of certain passive requests for supplemental information and/or machine-generated replay requests.

Authorization to access supplemental information may be granted based on one or more authorization levels. For example, in some embodiments, access to an image of an identification card may grant a first level of access (e.g., based on information encoded in a lower quality but highly reliability and/or reproducible watermark). This level of access may allow for data to be accessed that may be readily discernable from viewing the identification card such as, for example and without limitation, keyword information and/or metadata relating to a user (e.g., hair color, eye color, gender, etc.).

Figure 6:
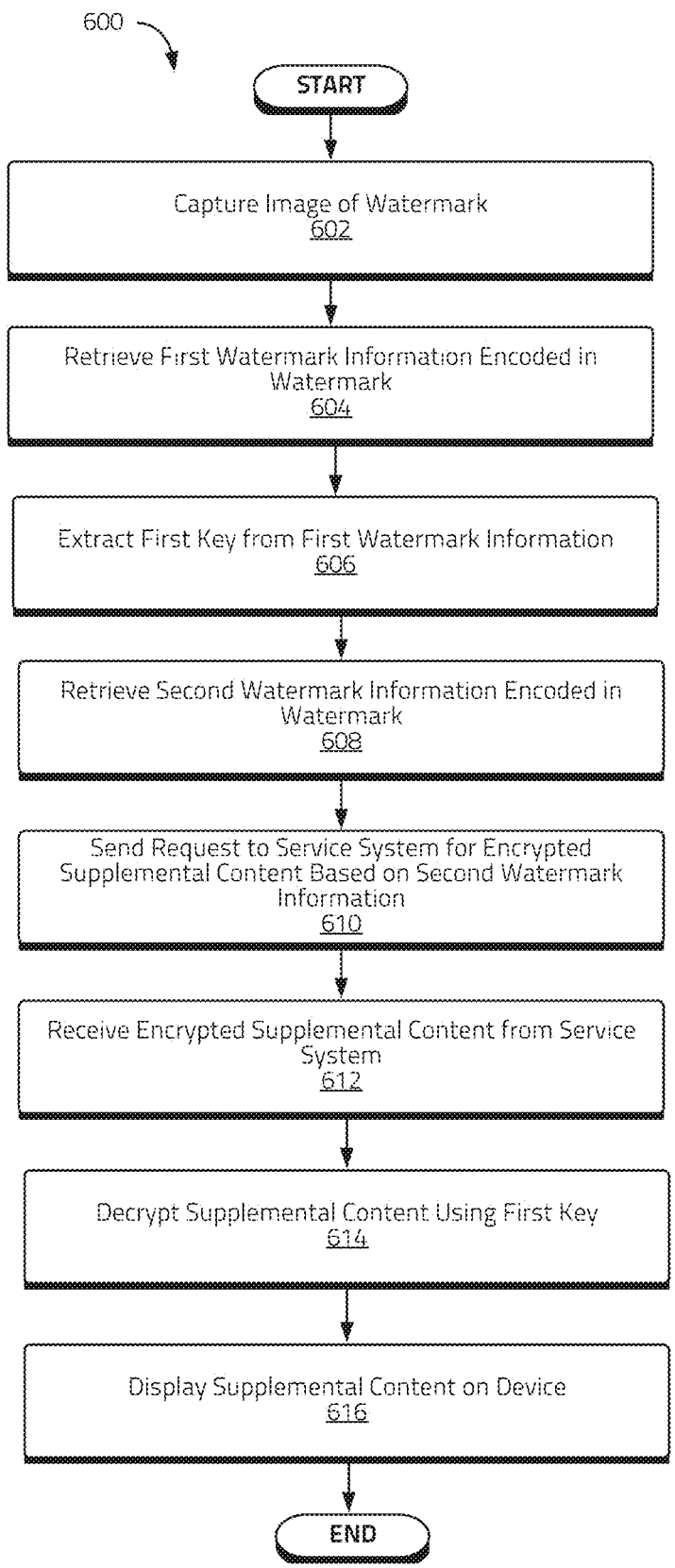
FIG. 6 illustrates a flow chart of an example of a method of managing access to supplemental information associated with content consistent with certain embodiments disclosed herein.

Access to information provided by a short-range wireless communication component may provide access to information that may be used to request additional information about an individual (e.g., a token), and/or access to information that may enable acquiring the information from the watermarked image (if it were to become available at a later time). If a token is used, the token may be able to be redeemed (e.g., redeemed with approval) for a time-expiring license to view the supplemental information. If a key is employed, the key may be used with information from the watermark to access basic information FIG. 6 illustrates a flow chart of an example of a method 600 of managing access to supplemental information associated with content consistent with certain embodiments disclosed herein. The illustrated method 600 may be implemented in a variety of ways, including using software, firmware, hardware, and/or any combination thereof. In certain embodiments, various aspects of the method 600 and/or its constituent steps may be performed by a user device, a service system, and/or any other suitable device, system, and/or service or combination of devices, systems, and/or services.

At 602, an image of a watermark associated with a content item may be captured by a sensor system of the user device. For example, a camera system of the user device may be used to capture the image of the watermark. Other sensor systems may also be used including, for example and without limitation, an infrared sensor system. The content item may comprise, for example and without limitation, a photograph, and identification card, and/or the like.

First watermark information encoded in the watermark may be retrieved from the captured image of the watermark at 604. At 606, a first cryptographic key may be extracted from the first watermark information. In some embodiments, the first cryptographic key may be included in the first watermark information in the clear and/or otherwise in an unencrypted form. In further embodiments, the first cryptographic key may be included in the first watermark information in an encrypted form.

If the first cryptographic key is encrypted, extracting the key may comprise decrypting the key using a second cryptographic key. The second cryptographic key may be a key associated with a user of the device and/or the device itself and/or may comprise a key provisioned to the device by the service system that also provisions supplementary information associated with the content and/or by a separate service and/or system. In some embodiments, the second cryptographic key may be received from a wireless communication component associated with the content item. In certain embodiments, the component may comprise a proximity-based wireless communication component such as, for example and without limitation, an NFC chip and/or a RFID chip.

At 608, second watermark information encoded in the image of the watermark may be retrieved. In some embodiments, the second watermark information may comprise information used to retrieve encrypted supplemental content from a service system. In some embodiments, the second watermark information may identify the service system and/or supplemental content, which may be encrypted, associated with the watermark and/or content item.

A request may be sent from the user device to the service system for the encrypted supplemental content at 610, and the service system may communicate the encrypted supplemental content to the user device in response to the request at 612. At 614, the encrypted supplemental content may be decrypted by the user device using the first cryptographic key. The supplemental content may comprise, for example and without limitation, at least one of metadata information, image information, text information, personal information, VR information, AR information, and/or the like. The decrypted supplemental content may be displayed on a display of the user device at 616.

Watermark Binding and Ledger Checking

In various embodiments, systems and methods disclosed herein may perform various checking operations to determine whether watermarks and associated content items have one or more defined relationships. This may, among other things, allow for relatively secure bindings to be established between watermarks and associated content items and/or facilitate checking to identify when watermarks and/or associated content items have been tampered with and/or otherwise modified.

Figure 7:
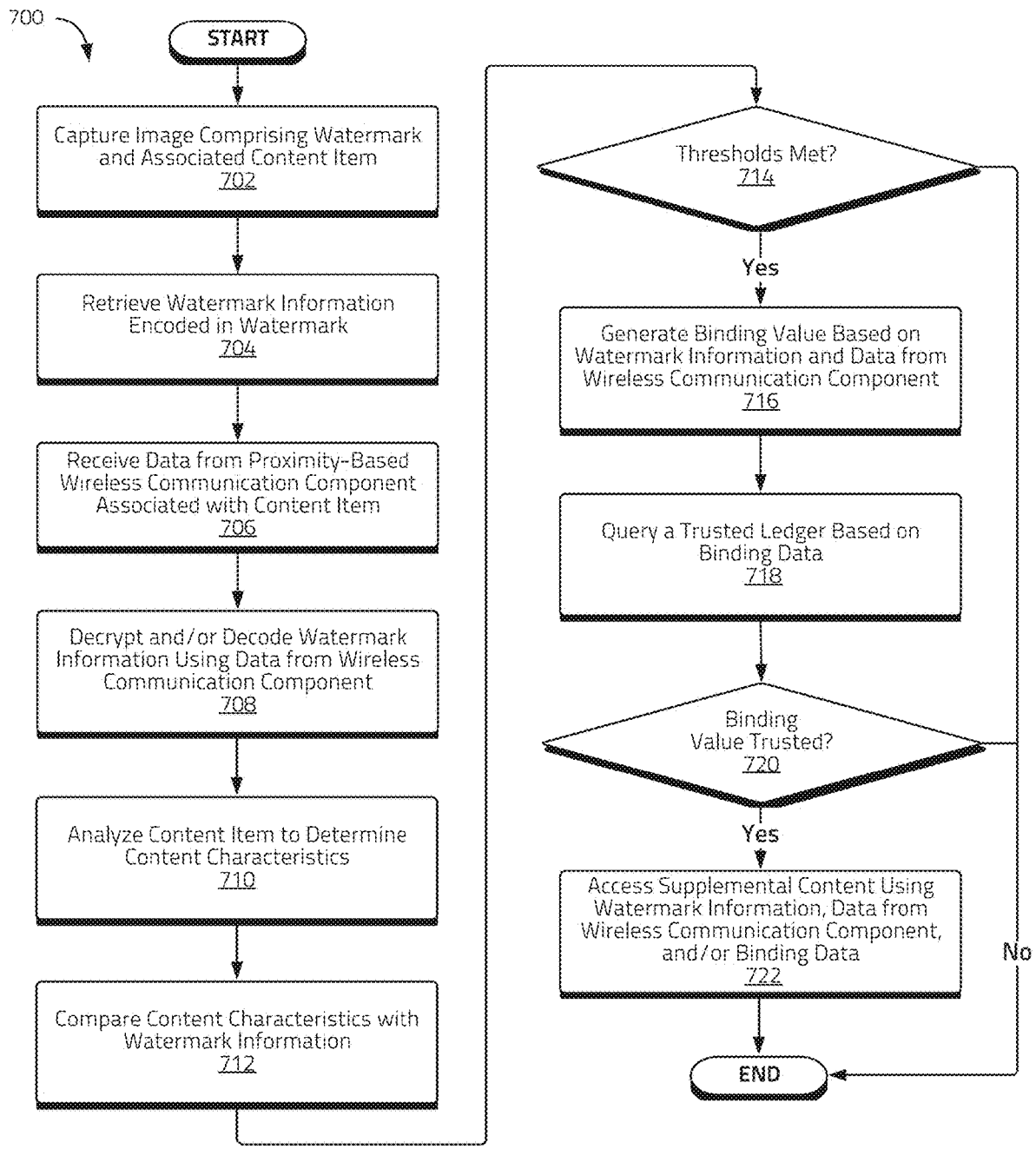
FIG. 7 illustrates a flow chart of an example of a method of accessing supplemental information associated with content using securely bound watermarks consistent with certain embodiments disclosed herein.

FIG. 7 illustrates a flow chart of an example of a method 700 of accessing supplemental information associated with content using securely bound watermarks consistent with certain embodiments disclosed herein. The illustrated method 700 may be implemented in a variety of ways, including using software, firmware, hardware, and/or any combination thereof. In certain embodiments, various aspects of the method 700 and/or its constituent steps may be performed by a user device, a service system, and/or any other suitable device, system, and/or service or combination of devices, systems, and/or services.

At 702, at image of a watermark and associated content item may be captured by a sensor system of a user device (e.g., a camera sensor system, an infrared sensor system, and/or the like). For example, an image of a watermark and an associated photograph printed on a content item may be captured by a camera system of the device.

Watermark information encoded in the watermark may be retrieved from the captured image of the watermark and associated content item at 704. At 706, data may be received from a wireless communication component associated with the content item such as, for example and without limitation, a proximity-based wireless communication component. The proximity-based wireless communication component may comprise, for example and without limitation, an NFC chip and/or an RFID chip.

In some embodiments, the watermark information may be encrypted and/or otherwise encoded in a protected form and/or may require other information for decryption and/or decoding. The data received from the wireless communication component may be used to decrypt and/or otherwise decode the watermark information at 708. For example and without limitation, in some embodiments, the data received from the wireless communication component may comprise a cryptographic key that may be used to decrypt the watermark information.

At 710, information relating to the captured image of the watermark and the associated content item may be analyzed to identify various characteristics associated with the content item and/or the watermark. A variety of characteristics may be identified including, for example and without limitation, hashes of associated information encoded in the watermark and/or content item and/or portions thereof, certain features and/or other characteristics of the watermark and/or content item and/or portions thereof, and/or the like. In various embodiments, such characteristics may have certain defined relationships if a watermark is securely bound to a content item and/or the watermark and/or content item have not been altered and/or tampered with.

One or more identified characteristics of the content item and/or the associated watermark information and/or identified characteristics of the watermark may be compared at 712. In certain embodiments, this may function as a check to determine whether a watermark is securely bound to an image and/or is otherwise bound to an image in a particular way. That is, the comparison at 712 may function as a check to determine whether watermarks and associated content items have one or more defined relationships.

While in some embodiments and/or implementations the comparison may check whether the identified characteristics of the content item and/or the associated watermark information and/or identified characteristics of the watermark match, in further embodiments the comparison may check whether the identified characteristics of the content item and/or the associated watermark information and/or identified characteristics of the watermark are within certain thresholds. In at least one non-limiting example, it may be determined whether a hash of the watermark information and/or a portion thereof matches a hash of at least a portion of the identified characteristics of the content item. If it is determined at 714 that hashes match (and/or other compared characteristics are within certain thresholds), it may be determined that the watermark and the associated content are securely bound and/or have not been altered and/or tampered with. Although not specifically illustrated, in some embodiments, the method 700 may similarly check a binding between the watermark information and/or the data received from the wireless communication component.

At 716, a binding value may be generated based on at least a portion of the watermark information and/or associated characteristics and/or information associated with the content item and/or a portion thereof (e.g., one or more identified characteristics of the content item, data received from the wireless communication component, etc.). A variety of binding values and/or associated methods for generating a binding value may be used in connection with various disclosed embodiments. In at least one non-limiting example, a binding value may be generated by generating a hash using a combination of a hash of at least a portion of watermark information and a hash of the identified characteristics and/or information associated with the content item and/or a portion thereof. It will be appreciated, however, that a variety of other techniques of generating a binding value may also be employed.

A query may be generated and issued to a service system at 718 that comprises the binding data. The service system, which may comprise a system maintaining a registration and/or database of current associations between watermarks and/or content items employing associated binding data, may determine whether the binding data issued in the query is included in a database. In some embodiments, the database may comprise a trusted ledger such as, for example and without limitation, a blockchain ledger and/or a blockchain derivative ledger, although other suitable types of databases may also be used. The service system may issue a response indicating whether the binding data is included in the database maintained by the service.

At 720, it may be determined whether the binding data is trusted and/or otherwise represents a valid and/or registered association between a watermark and a content item based on the response received from the service system. If the binding data is trusted and/or otherwise represents a valid and/or registered association between a watermark and a content item, the user device may access supplemental content at 722 consistent with various disclosed embodiments (potentially accessing supplemental content from the service system performing binding value checks and/or a separate service system) using one or more of the watermark information, the data from the wireless communication component, the binding data, and/or the like and/or portions thereof.

Key Generation Based on Proximity-Based Communication Components and Watermarks

In some embodiments, cryptographic keys may be generated based on information retrieved from proximity-based communication components and/or watermark information encoded within watermarks associated with a content item. For example and without limitation, in at least one non-limiting embodiment, a hash of watermark information and/or a portion thereof and a hash of information included in an image of a content item and/or portions thereof may be generated. These hashes may be combined in a suitable manner to generate a cryptographic key. For example, the hashes may be combined and hashed together to generate a cryptographic key. In another non-limiting example, a hash of the watermark information and/or a portion thereof and a hash of information received from a wireless component associated with a content item and/or portions thereof may be generated. These hashes may be combined in a suitable manner to generate a cryptographic key. In this manner, a key may be generated based on the information retrieved from proximity-based communication components and/or watermark information encoded within watermarks associated with a content item. The generated key may be used in connection with a variety of cryptographic operations, including any of the cryptographic operations described herein.

Figure 8:
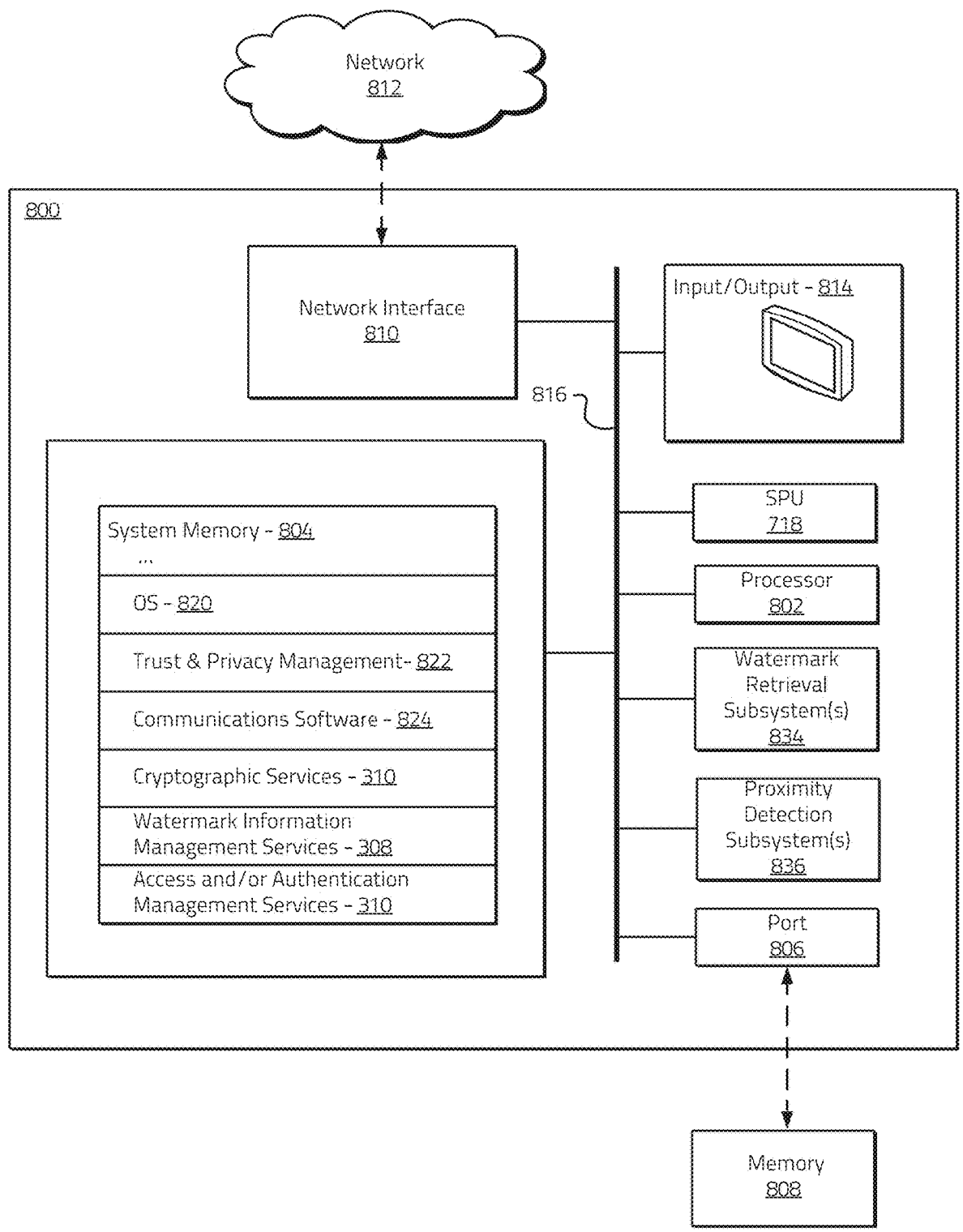
FIG. 8 illustrates a system that may be used to implement certain embodiments of the systems and methods of the present disclosure.

FIG. 8 illustrates an example of a system 800 that may be used to implement certain embodiments of the systems and methods of the present disclosure. The system 800 may comprise a variety of computing devices and/or systems, including any computing system suitable to implement the systems and methods disclosed herein. In various embodiments, the system 800 may comprise a system and/or device associated with a user and/or service system, and/or any other service, system, device, application and/or component configured to implement aspects of the embodiments of the disclosed systems and methods.

As illustrated in FIG. 7, the example system 800 may comprise: a processing unit 802; system memory 804, which may include high speed random access memory ("RAM"), non-volatile memory ("ROM"), and/or one or more bulk non-volatile computer-readable storage mediums (e.g., a hard disk, flash memory, etc.), which may be non-transitory, for storing programs and other data for use and execution by the processing unit 802; a port 806 for interfacing with removable memory 808 that may include one or more diskettes, optical storage mediums (e.g., flash memory, thumb drives, USB dongles, compact discs, DVDs, etc.) and/or other computer-readable storage mediums, which may be non-transitory; a network interface 810 for communicating with other devices and/or systems via one or more network connections and/or networks 812 using one or more communication technologies; a user interface 814 that may include a display and/or one or more input/output devices such as, for example, a touchscreen, a keyboard, a mouse, a track pad, and the like; and one or more busses 816 for communicatively coupling the elements of the system. The system may further include one or more watermark retrieval subsystems and/or sensor systems 834 (e.g., a camera) and/or one or more proximity-based wireless communication and/or detection subsystems 836.

In some embodiments, the system 800 may, alternatively or in addition, include a TEE and/or an SPU 818 that is protected from tampering by a user of the system or other entities by utilizing secure physical and/or virtual security techniques. A TEE and/or a SPU 818 can help enhance the security of sensitive operations such as personal information management, trusted credential and/or key management, privacy and policy management, and other aspects of the systems and methods disclosed herein. In certain embodiments, the TEE and/or SPU 818 may operate in a logically secure processing domain and be configured to protect and operate on secret information, as described herein. In some embodiments, the TEE and/or a SPU 818 may include internal memory storing executable instructions or programs configured to enable the TEE and/or SPU 818 to perform secure operations, as described herein.

The operation of the system 800 may be generally controlled by the processing unit 802, TEE, and/or an SPU 818 operating by executing software instructions and programs stored in the system memory 804 (and/or other computer-readable media, such as memory 808, which may be removable). The system memory 804 may store a variety of executable programs or modules for controlling the operation of the system. For example, the system memory may include an operating system ("OS") 820 that may manage and coordinate, at least in part, system hardware resources and provide for common services for execution of various applications and a trust and privacy management system 822 for implementing trust and privacy management functionality including protection and/or management of secure data through management and/or enforcement of associated policies.

The system memory 804 may further include, without limitation, communication software 824 configured to enable in part communication with and by the system, one or more applications, cryptographic services 312 configured to perform various secure cryptographic functions consistent with embodiments disclosed herein, watermark information management services 308, access and/or authentication management services 310, and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method for managing access to supplemental electronic content associated with a content item performed by a user device comprising at least one processor and at least one computer-readable storage medium storing instructions that, when executed by the at least one processor, cause the user device to perform the method, the method comprising:
   detecting a watermark associated with the content item, the watermark encoding watermark information;
   accessing content information included in the watermark information;
   analyzing the content item to determine content characteristics associated with at least a portion of the content item;
   generating a binding value based, at least in part, on at least a portion of the content information and the determined content characteristics associated with the at least a portion of the content item;
   querying a ledger service system to determine whether the binding value has been recorded in a trusted ledger managed by the ledger service system;
   receiving a response from the ledger service system indicating that the binding value is recorded in the trusted ledger; and
   accessing, based on receiving the response, the supplemental electronic content using the watermark information.

2. The method of claim 1, wherein at least a portion of the watermark information is encrypted and where accessing the content information comprises decrypting the encrypted portion of the watermark information.

3. The method of claim 2, wherein the method further comprises receiving, from a wireless communication component, a cryptographic decryption key.

4. The method of claim 3, wherein the wireless communication component comprises a proximity-based wireless communication component.

5. The method of claim 4, wherein the proximity-based wireless communication component is associated with the content item.

6. The method of claim 4, wherein the proximity-based wireless communication component comprises at least one of a near field communication chip, a radio-frequency identification chip, and/or a wireless communication system.

7. The method of claim 3, wherein decrypting the encrypted portion of the watermark information comprises decrypting the encrypted portion of the watermark information using the cryptographic decryption key.

8. The method of claim 2, wherein the method further comprises sending, by the user device to a service, an authorization request, the authorization request being generated based, at least in part, on the watermark information.

9. The method of claim 8, wherein the method further comprises receiving, in response to the authorization request, a cryptographic decryption key from the service, and wherein portion of the encrypted watermark information comprises decrypting the encrypted portion of the watermark information using the cryptographic decryption key.

10. The method of claim 1, wherein detecting the watermark associated with the content item comprises detecting the watermark using a sensor system of the user device.

11. The method of claim 10, wherein the sensor system comprises a camera system and wherein detected the watermark comprises detecting an image of the watermark.

12. The method of claim 1, wherein the watermark information encodes the supplemental electronic content.

13. The method of claim 1, wherein the watermark information encodes link information for accessing the supplemental electronic content.

14. The method of claim 1, wherein the watermark information encodes location information for accessing the supplemental electronic content.

15. The method of claim 1, wherein the method further comprises displaying the supplemental electronic content on a display of the user device.

16. The method of claim 1, wherein the content item comprises an identification card.

17. The method of claim 1, wherein the content item comprises a photograph.

18. The method of claim 1, wherein the supplemental electronic content comprises at least one of metadata information, image information, text information, personal information, virtual reality information, and augmented reality information.

* * * * *